United States Patent
Clark et al.

(10) Patent No.: US 9,527,375 B2
(45) Date of Patent: Dec. 27, 2016

(54) POWERTRAIN WITH TRANSMISSION-BASED MOTOR/GENERATOR FOR ENGINE STARTING AND REGENERATIVE BRAKING MODES

(71) Applicant: GM GLOBAL TECHNOLOGY OPERATIONS LLC, Detroit, MI (US)

(72) Inventors: Roger A. Clark, Clarkston, MI (US); Alan G. Holmes, Clarkston, MI (US)

(73) Assignee: GM Global Technoogy Operations LLC, Detroit, MI (US)

(*) Notice: Subject to any disclaimer, the term of this patent is extended or adjusted under 35 U.S.C. 154(b) by 71 days.

(21) Appl. No.: 14/464,053

(22) Filed: Aug. 20, 2014

(65) Prior Publication Data
US 2016/0052382 A1 Feb. 25, 2016

(51) Int. Cl.
*B60K 6/38* (2007.10)
*B60K 6/40* (2007.10)
(Continued)

(52) U.S. Cl.
CPC . *B60K 6/40* (2013.01); *B60K 6/26* (2013.01); *B60K 6/387* (2013.01); *B60K 6/48* (2013.01);
(Continued)

(58) Field of Classification Search
CPC ..... Y10T 477/26; Y10T 477/24; B60K 6/387; B60K 6/48; B60K 6/38; B60K 2006/4808; B60K 2006/268; B60K 2006/4825; B60M 20/40
(Continued)

(56) References Cited

U.S. PATENT DOCUMENTS 8,606,450 B2    12/2013  Holmes et al.
8,840,523 B2 *  9/2014   Tajima ................... B60K 6/387
                                                192/48.91
(Continued)

FOREIGN PATENT DOCUMENTS

DE    10209514 A1    10/2002
DE    10250853 A1     5/2004
(Continued)

OTHER PUBLICATIONS

English translation of JP2012240624A; http://translationportal.epo.org; Jun. 16, 2016.*

*Primary Examiner* — Roger Pang
(74) *Attorney, Agent, or Firm* — Quinn Law Group, PLLC

(57) ABSTRACT

A powertrain is provided that has an engine with a rotatable crankshaft. The powertrain has a transmission with a transmission input member and a transmission output member. A final drive is operatively connected to the transmission output member and includes a drive axle. An engine clutch has an engaged state that operatively connects the engine crankshaft with the transmission input member, and has a disengaged state that operatively disconnects the engine crankshaft from the transmission input member. A motor/generator is provided and a first torque-transmitting device has a selectively engaged state in which the first torque-transmitting device transmits torque between the motor/generator and the transmission output member independent of the engine, the crankshaft, and the engine clutch. A second torque-transmitting device has a selectively engaged state in which the second torque-transmitting device transmits torque between the motor/generator and the crankshaft independent of the first torque-transmitting device and the engine clutch.

16 Claims, 3 Drawing Sheets

(51) Int. Cl.
| | |
|---|---|
| B60K 6/26 | (2007.10) |
| B60K 6/387 | (2007.10) |
| B60K 6/48 | (2007.10) |
| B60W 20/00 | (2016.01) |
| B60K 6/547 | (2007.10) |
| B60W 10/02 | (2006.01) |
| B60W 10/06 | (2006.01) |
| B60W 10/08 | (2006.01) |
| B60W 10/11 | (2012.01) |
| B60W 10/30 | (2006.01) |
| B60W 30/18 | (2012.01) |
| B60K 6/543 | (2007.10) |
| F16H 3/00 | (2006.01) |
| F16H 37/02 | (2006.01) |

(52) U.S. Cl.
CPC ............... *B60K 6/543* (2013.01); *B60K 6/547* (2013.01); *B60W 10/02* (2013.01); *B60W 10/06* (2013.01); *B60W 10/08* (2013.01); *B60W 10/11* (2013.01); *B60W 10/30* (2013.01); *B60W 20/1062* (2013.01); *B60W 20/14* (2016.01); *B60W 20/40* (2013.01); *B60W 30/18127* (2013.01); *B60K 2006/268* (2013.01); *B60K 2006/4808* (2013.01); *B60K 2006/4825* (2013.01); *B60W 2510/1015* (2013.01); *B60W 2710/025* (2013.01); *B60W 2710/0644* (2013.01); *B60W 2710/1005* (2013.01); *F16H 3/006* (2013.01); *F16H 37/021* (2013.01); *Y10S 903/93* (2013.01)

(58) Field of Classification Search
USPC ............................... 180/65.22, 65.25, 65.26
See application file for complete search history.

(56) References Cited

U.S. PATENT DOCUMENTS

| | | | | |
|---|---|---|---|---|
| 2005/0137060 | A1* | 6/2005 | Kuras | B60K 6/46 477/214 |
| 2005/0279543 | A1* | 12/2005 | Seufert | B60K 6/48 180/65.25 |
| 2006/0247086 | A1* | 11/2006 | Watanabe | B60K 6/365 475/208 |
| 2010/0234172 | A1* | 9/2010 | Miyazaki | B60K 6/387 477/5 |
| 2011/0028260 | A1* | 2/2011 | Kawasaki | B60K 6/48 475/220 |
| 2011/0118075 | A1* | 5/2011 | Kawasaki | B60K 6/48 475/331 |
| 2011/0118077 | A1* | 5/2011 | Kawasaki | B60K 6/445 477/3 |
| 2012/0303201 | A1* | 11/2012 | Tsuneishi | B60K 6/547 701/22 |
| 2015/0258978 | A1* | 9/2015 | Shiratori | B60W 10/08 477/4 |

FOREIGN PATENT DOCUMENTS

| | | |
|---|---|---|
| DE | 102012214457 A1 | 2/2014 |
| JP | 2012240624 A | 12/2012 |

* cited by examiner

POWERTRAIN WITH TRANSMISSION-BASED MOTOR/GENERATOR FOR ENGINE STARTING AND REGENERATIVE BRAKING MODES

TECHNICAL FIELD

The present teachings generally include a powertrain that has a motor/generator operable to start an engine and to recapture vehicle braking energy.

BACKGROUND

Some hybrid vehicles use a BAS (belt alternator starter) connected to the engine crankshaft for engine starting and regenerative braking A. BAS arrangement requires that the engine crankshaft must spin when the alternator-starter is either producing electricity from regenerative braking or providing electric propulsion. Spinning the engine during these times produces mechanical losses from engine friction and from engine pumping losses if valve deactivation is not provided, diverting some of the energy from being useful.

Strong hybrid architectures have been proposed to couple a motor/generator, either directly or indirectly, to the transmission input, transmission output, or an intermediate shaft within the transmission, such as a layshaft. However, this same connection of the motor/generator (i.e., the direct or indirect connection to the transmission input, transmission output, or intermediate shaft) is also used for starting the engine, which limits the favorable gear ratio between the motor-generator and the engine to a level that is well below that provided by starter ring and pinion gears. For instance, a hybrid architecture that has the motor-generator coupled directly to the transmission output shaft has only the reciprocal of the lowest transmission speed ratio, which might amount to a ratio of approximately 2:1, to multiply the torque from the motor-generator to start the engine, while a typical starter ring and pinion might have a ratio of 10:1 or more.

SUMMARY

A powertrain is provided that allows a single motor/generator to gather regenerative braking energy without diversion to engine losses, and to use some of that energy for electric propulsion without diversion to engine losses. The powertrain has an engine with a rotatable crankshaft, and a transmission with a transmission input member and a transmission output member. The transmission may be a multi-speed automatic transmission, a continuously variable transmission, a dual clutch transmission, or other suitable transmission. A final drive is operatively connected to the transmission output member and includes a drive axle. An engine clutch has an engaged state that operatively connects the engine crankshaft with the transmission input member, and has a disengaged state that operatively disconnects the engine crankshaft from the transmission input member. A motor/generator is provided and a first torque-transmitting device has a selectively engaged state in which the first torque-transmitting device transmits torque between the motor/generator and the transmission output member independent of the engine, the crankshaft, and the engine clutch. A second torque-transmitting device has a selectively engaged state in which the second torque-transmitting device transmits torque between the motor/generator and the crankshaft independent of the first torque-transmitting device and the engine clutch.

The ability to establish a selectable connection to the engine crankshaft by engagement of the second torque-transmitting device allows engine starting via the motor/generator, including an auto-start when the engine clutch is disengaged. A separate selectable connection to the drive axle is established by engagement of the first torque-transmitting device, with the connection to the drive axle being independent of the state of the engine due to the ability to disengage the second torque-transmitting device and the engine clutch. Accordingly, the motor/generator can be controlled to function as a generator to recapture braking energy in a regenerative braking mode regardless of whether the engine is spinning. A controller may accomplish blending of the braking provided by regenerative braking and the braking provided by mechanical braking systems. A torque assist mode in which the motor/generator assists the engine in providing torque at the driveshaft is accomplished when the engine clutch and the first torque-transmitting device are engaged. A torque mode in which the motor/generator functions as a motor to propel the drive shaft with the engine disconnected is provided when the first torque-transmitting device is engaged and the engine clutch and the second torque-transmitting device are disengaged.

The above features and advantages and other features and advantages of the present teachings are readily apparent from the following detailed description of the best modes for carrying out the present teachings when taken in connection with the accompanying drawings.

DETAILED DESCRIPTION

Figure 1:
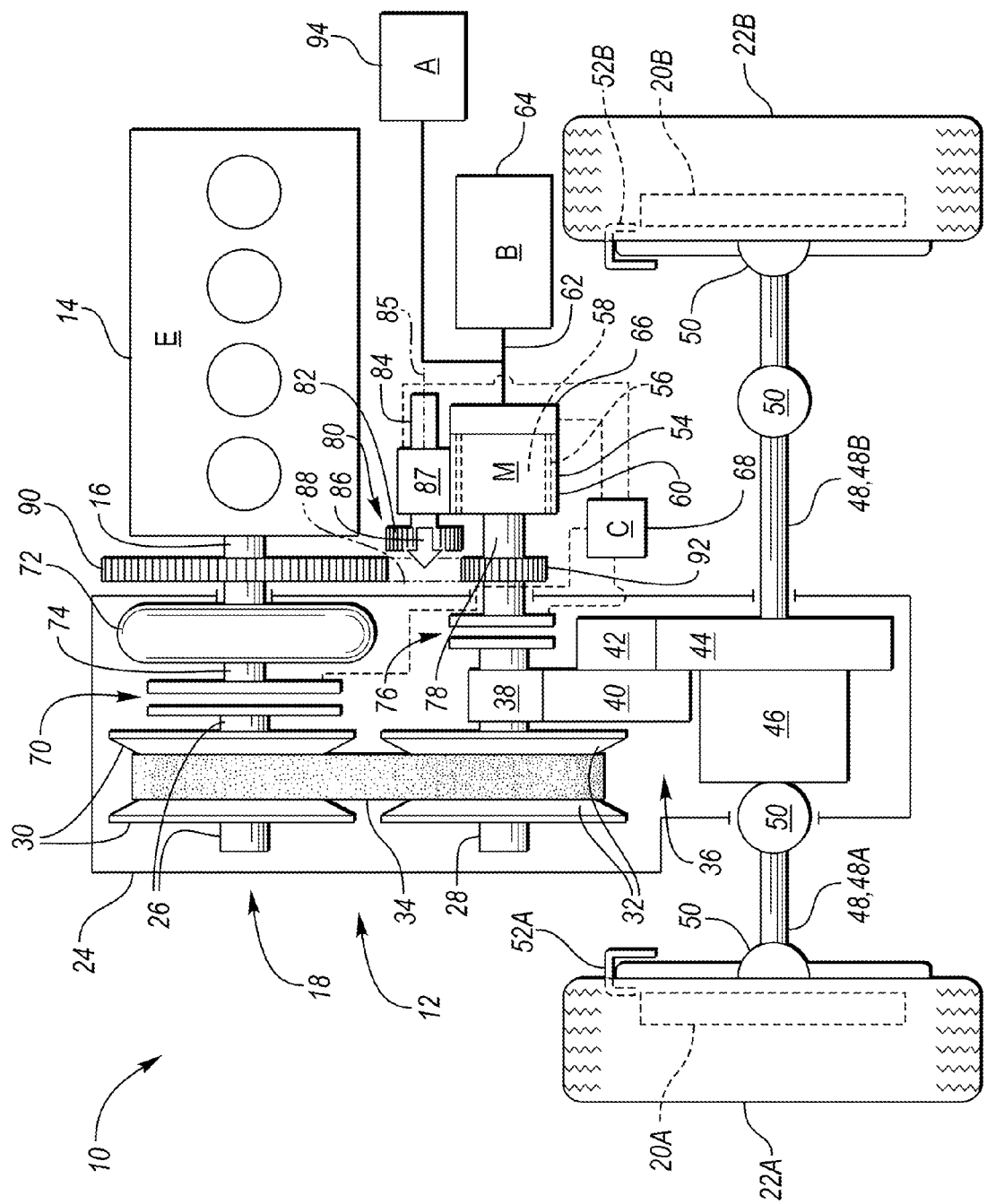
FIG. 1 is a schematic illustration in plan view of a portion of a first vehicle having a first powertrain.
Figure 2:
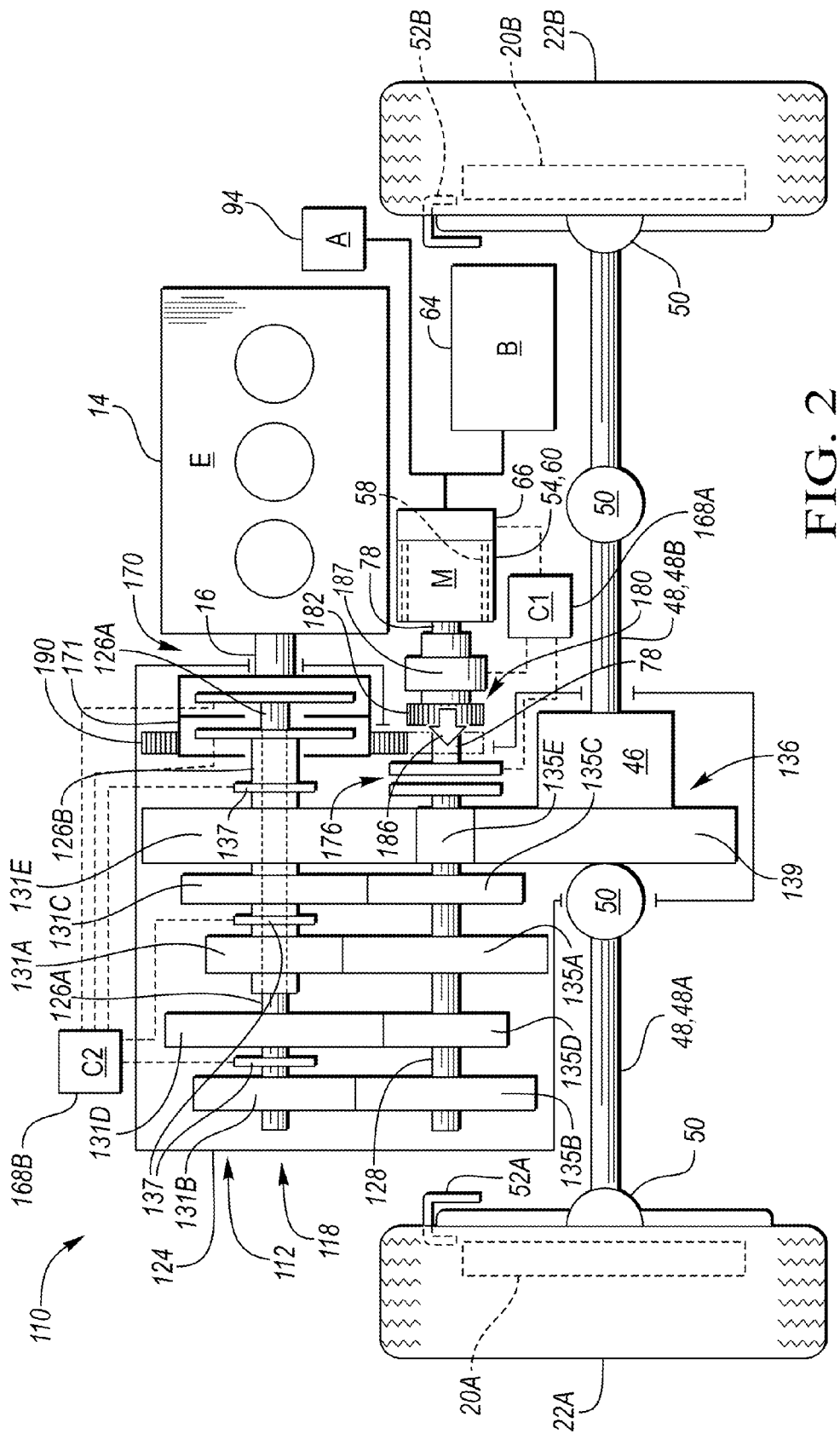
FIG. 2 is a schematic illustration in plan view of a portion of a second vehicle having a second powertrain in accordance with an alternative aspect of the present teachings.
Figure 3:
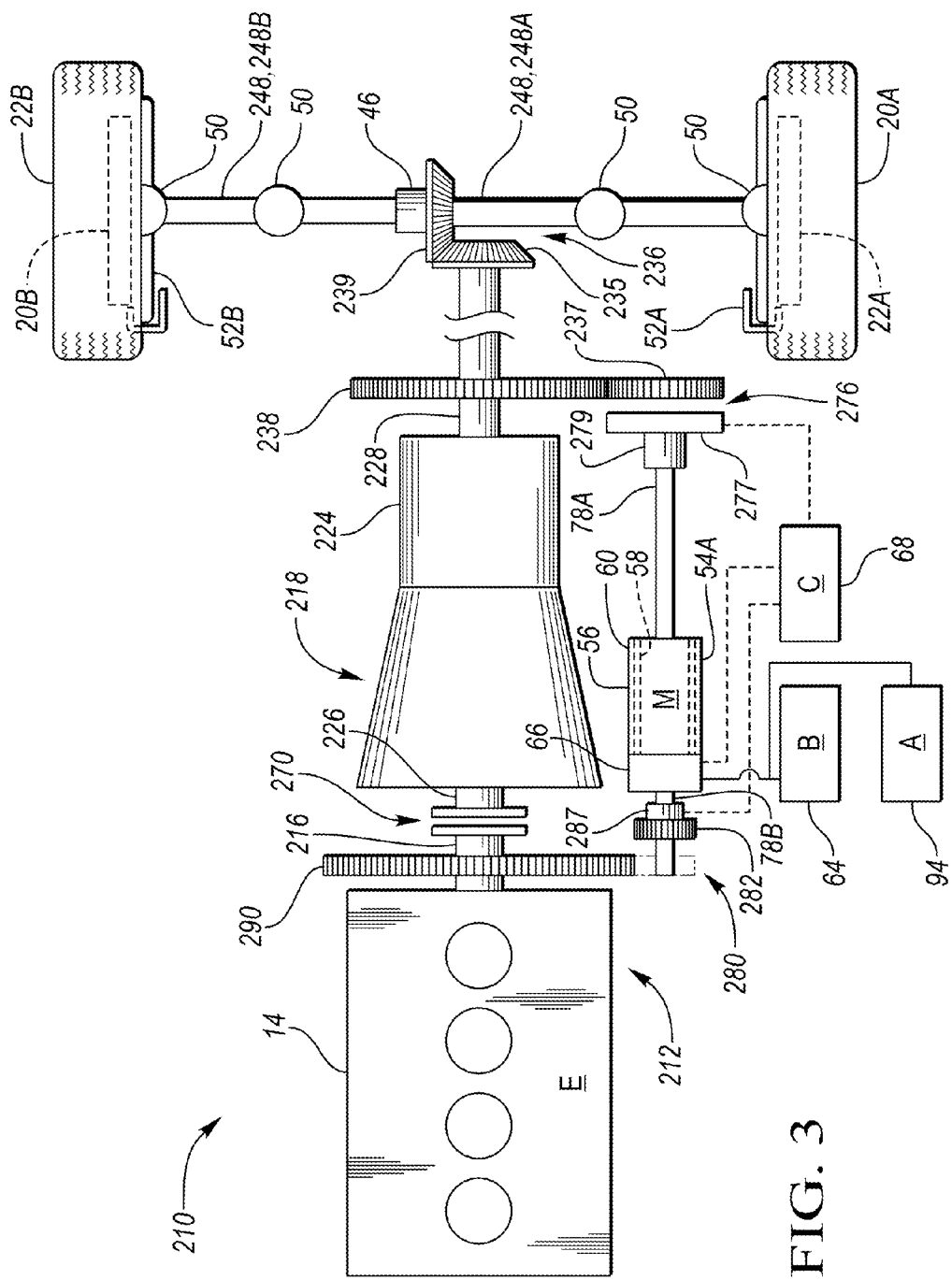
FIG. 3 is a schematic illustration in plan view of a portion of a third vehicle having a third powertrain in accordance with another alternative aspect of the present teachings.

Referring to the drawings, wherein like reference numbers refer to like components throughout the views, FIGS. 1-3 show vehicles with different embodiments of powertrains that can accomplish an engine auto-start and regenerative braking using only a single motor/generator and without requiring that the engine be spinning during regenerative braking. With reference to FIG. 1, a vehicle 10 has a powertrain 12 that includes an engine (E) 14 having a rotatable crankshaft 16. The engine 14 may be an internal combustion engine that is a spark ignition engine, a compression ignition engine, or another type of power plant.

The powertrain 12 also includes a transmission 18 operatively connectable to the engine 14 to provide tractive torque to first and second vehicle wheels 20A, 20B having respective tires 22A, 22B mounted thereto. More specifically, the transmission 18 is a continuously variable transmission, although other types of transmissions may be utilized. The transmission 18 has a housing 24, a transmission input member 26, and a transmission output member 28 at least partially housed in the housing 24. An input pulley 30 has pulley sheaves mounted on the transmission input member 26, and an output pulley 32 has pulley sheaves mounted on the transmission output member 28. A belt 34 transmits torque at a variable ratio from the input member 26 to the output member 28 dependent upon the relative positions of the pulley halves, as is understood by those skilled in the art.

Torque is transferred from the transmission output member 28 to the wheels 20A, 20B through a final drive 36. The final drive 36 includes a torque multiplying, multi-stage gear train with a first gear 38 mounted on the output member 28 to rotate therewith, a second gear 40 meshing with the first gear 38 and larger in diameter than the first gear 38. A third gear 42 is operatively connected with the second gear 40 to rotate with the second gear 40 at the same speed. The second and third gears 40, 42 may be an integral stepped gear. The third gear 42 meshes with a fourth gear 44 that is a ring gear of a differential 46. Torque is transferred from the differential 46 to a drive axle 48 that has two half shafts 48A, 48B. Various constant velocity joints 50 are shown. A first mechanical braking system 52A is mounted to the first wheel 20A, and a second mechanical braking system 52B is mounted to the second wheel 20B. The mechanical braking systems 52A, 52B are shown only schematically and may be any suitable braking system, such as a friction disk braking system as understood by those skilled in the art. The braking systems 52A, 52B are controlled to brake the wheels 20A, 20B as further described herein.

The powertrain 12 has hybrid functionality as it has a single electric motor/generator (M) 54 controllable to function as a motor under some vehicle operating conditions, and as a generator under other vehicle operating conditions. In one embodiment and by way of nonlimiting example, the motor/generator 54 has an annular stator 56 and a rotor 58 surrounded by the stator 56 inside of a nonrotatable motor housing 60. The stator 56 and the rotor 58 are indicated with hidden lines inside of the housing 60. The stator 56 is fixed to the housing 60 and can receive electrical current from an integrated motor controller power inverter module (MPIM) 66 which receives the current through transfer conductors 62 from energy stored in an energy storage device 64 (B). The energy storage device may be a battery or battery pack and may also be referred to herein as a battery.

The powertrain 12 includes at least one electronic controller that controls the functioning of various components as described herein to establish different operating modes. In the embodiment of FIG. 1, there are two electronic controllers that communicate with one another. One controller is included in the MPIM 66 mounted to and integral with the motor/generator 54. The MPIM 66 controls the motor/generator 54 to function as a motor or as a generator based on control input received from a separate electronic controller (C) 68 that receives operating input signals indicative of vehicle operating conditions from various other components, as discussed herein.

The MPIP 66 converts direct current provided from the energy storage device 64 to alternating current needed to power the stator 56, if the motor/generator 54 utilizes alternating current, such as if it has three-phase windings. Alternatively, a power inverter can be integrated in the controller 68 and the controller 68 may be the only electronic controller.

The powertrain 12 has strategically positioned torque-transmitting devices and clutches that enable desired operating modes in an energy efficient manner. First, an engine clutch 70 is positioned within the transmission housing 24 and is selectively engageable and disengageable in response to control signals from the controller 68 to connect the crankshaft 16 for common rotation with the transmission input member 26 and disconnect the crankshaft 16 from common rotation with the transmission input member 26, respectively. The engine clutch 70 can be electrically or hydraulically actuated, and may be normally engaged or normally disengaged. As used herein, two components are configured to "rotate commonly" or are connected for "common rotation" when the two components are connected to one another by a torque-transmitting device such as a clutch to rotate at the same speed. In the embodiment shown, the connection of the crankshaft 16 to the transmission input member 26 is indirect, as it is through a fluid coupling torque converter 72. The torque converter 72 gradually increases torque transfer from the crankshaft 16 to an engine clutch input shaft 74 through a fluid coupling as is understood by those skilled in the art. When the torque converter 72 fully couples the crankshaft 16 with the clutch input shaft 74, engagement of the engine clutch 70 enables the transmission input member 26 to rotate at the same speed as the crankshaft 16. The engine clutch 70 thus has an engaged state that operatively connects the engine crankshaft 16 with the transmission input member 26, and has a disengaged state that operatively disconnects the crankshaft 16 from the transmission input member 26. The engine clutch 70 may be a friction plate clutch or other suitable type of clutch.

Additionally, the powertrain 12 includes a first torque-transmitting device 76 that is selectively engageable and disengageable in response to control signals from the controller 68 to connect a motor shaft 78 for common rotation with the transmission output member 28 and disconnect the motor shaft 78 from common rotation with the transmission output member 28, respectively. The motor shaft 78 extends from and rotates commonly with the rotor 58. The first torque-transmitting device 76 thus has a selectively engaged state in which torque is transmitted between the motor/generator 54 and the transmission output member 28. The connection between the motor/generator 54 and the transmission output member 28 is independent of the engine 14, the crankshaft 16, and the engine clutch 70. In other words, torque-transmission from the motor shaft 78 to the transmission output member 28 occurs when the first torque-transmitting device 76 is engaged regardless of whether or not the engine 14 is on with the crankshaft 16 rotating, and regardless of whether the engine clutch 70 is in the engaged state or the disengaged state.

The powertrain 12 also has a second torque-transmitting device 80 that has a selectively engaged state in which the second torque-transmitting device 80 transmits torque between the motor/generator 54 and the crankshaft 16. In the embodiment shown, the second torque-transmitting device 80 is a sliding idler gear 82 mounted on a shaft 84 supported for rotation about an axis 85 by bearings or the like (not shown). The shaft 84 and gear 82 can be moved in the direction of arrow 86 by an actuator 87 from a disengaged state shown to a position 88 shown in phantom to establish an engaged state. The actuator 87 can be an electric solenoid energized by the electrical control signal from the controller 68 to move the sliding idler gear 82. In the engaged state, the idler gear 82 meshes with both a ring gear 90 and the pinion gear 92. The ring gear 90 is mounted on the crankshaft 16 for common rotation with the crankshaft 16. The pinion gear 92 is mounted on the motor shaft 78 for common rotation with the motor shaft 78.

Accordingly, when the idler gear 82 is in the engaged position, a torque transmission path is established from the motor/generator 54 to the crankshaft 16. Torque transfer can occur independent of the state of the first torque-transmitting device 76 and independent of the state of the engine clutch 70. In other words, torque-transmission from the motor shaft 78 to the crankshaft 16 occurs when the second torque-transmitting device 80 is engaged regardless of whether or not the engine 14 is connected for torque transmission to the transmission 18 by the engine clutch 70, and regardless of whether the motor/generator 54 is connected for torque transmission with the transmission 18 by the second torque-transmitting device 80.

With the powertrain 12 arranged in this manner, the controller 68 can control the powertrain 12 to provide a regenerative braking mode, an engine auto-start mode, and a torque assist mode dependent on vehicle operating conditions and all using the single electric motor/generator 54. The controller 68 has a processor with a stored algorithm that may include a regenerative braking module, an engine auto-start module, and a torque assist module, each of which establishes a respective operating mode based on vehicle operating conditions input as data to the controller 68, such as by sensor signals from sensors, including data regarding the operating state of the clutch 70 and the torque-transmitting devices 76 and 80, data regarding the state of the engine 14, such as whether the engine 14 is on (i.e., being fueled), whether the crankshaft 16 is rotating, data regarding the operating state of the energy storage device 64, operating state of the motor/generator 54, and vehicle operator demands such a braking demand from a braking input device such as a brake pedal, or a torque demand from a torque input device, such as an accelerator pedal.

Specifically, when the controller 68 receives vehicle operating conditions indicative of vehicle deceleration, the controller 68 can establish a regenerative braking mode in which braking energy of slowing the wheels 20A, 20B is provided by controlling the motor/generator 54 to function as a generator, thereby converting the kinetic energy of the wheels 20A, 20B into electrical energy stored in the energy storage device 64. The controller 68 may also receive a signal from a battery controller (not shown) or a sensor connected to the energy storage device 64 that is indicative of a state-of-charge of the energy storage device 64, and/or other operating condition of the energy storage device 64, to ensure that predetermined requirements for establishing a regenerative braking mode are met. For example, establishment of the regenerative braking mode may also be dependent upon a state-of-charge of the energy storage device 64 being less than a predetermined state-of-charge. Additionally, the stored algorithm executed by the processor of the controller 68 may include a brake blending module in which braking energy provided by the mechanical braking systems 52A, 52B is combined with braking energy provided by regenerative braking to meet a predetermined braking torque demand received as a vehicle operating condition input to the controller 68, such as from depression of a brake pedal, and/or a vehicle deceleration signal.

If the controller 68 determines that the vehicle operating conditions indicate that the regenerative braking mode should be established, the controller 68 sends control signals that cause engagement of the first torque-transmitting device 76 if not already engaged, disengagement of the second torque-transmitting device 80 if in an engaged state, and that cause the motor/generator 54 to function as a generator. Additionally, the controller 68 controls the engine clutch 70 to establish the disengaged state during the regenerative braking mode. Because the crankshaft 16 is not operatively connected to the motor/generator 54 in the regenerative braking mode, torque-transmission from the motor shaft 78 to the transmission output member 28 occurs regardless of whether or not the engine 14 is on with the crankshaft 16 rotating. Mechanical losses from engine friction and engine pumping losses that would otherwise occur if the torque flow path through the regenerative braking mode was through the engine 14 are thus avoided.

The powertrain 12 can also use the single motor/generator 54 to establish an engine starting mode in which the engine 14 is started, either as an initial cold start, or as an auto-start. The controller 68 sends control signals that establish the engine starting mode. When the controller 68 receives vehicle operating conditions indicating a request for vehicle torque demand, such as may be indicated by release of a brake pedal or an accelerator pedal input signal. In the engine starting mode, the motor/generator 54 is controlled to function as a motor to provide torque to the crankshaft 16 to start the engine 14. If the controller 68 determines that the vehicle operating conditions indicate that the engine starting mode should be established, the controller 68 sends control signals that cause the second torque-transmitting device 80 to be in the engaged state, the first torque-transmitting device 76 to be in the disengaged state, and the motor/generator 54 to function as a motor to turn the crankshaft 16 to start the engine 14. Additionally, the controller 68 controls the engine clutch 70 to establish the disengaged state during the engine starting mode. Optionally, the electronic controller 68 can control the engine clutch 70 to slip to synchronize the speed of the engine crankshaft 16 with the speed of the transmission input member 26 following starting of the engine 14 with the motor/generator 54. Controlled slip may especially be useful in an embodiment in which the torque converter 72 is not provided.

The powertrain 12 can also use the single motor/generator 54 to function as a motor in a propulsion mode to assist the engine 14 in providing torque at the drive axle 48 to propel the vehicle 10. This propulsion mode may be referred to as a torque assist mode, in which the electronic controller 68 controls the engine clutch 70 to be in the engaged state, the first torque-transmitting device 76 to be in the engaged state, and the second torque-transmitting device 80 to be in the disengaged state. With the second torque-transmitting device 80 disengaged, the motor shaft 78 can rotate at a speed equal to that of the transmission output member 28, while the engine crankshaft 16 rotates at a speed equal to that of the transmission input member 26. The gear ratios of the pinion gear 92 to the sliding idler gear 82, or of the sliding idler gear 82 to the ring gear 90 do not affect the speed of the motor shaft 78 or the speed of the crankshaft 16. The torque assist mode can thus occur while the continuously variable transmission is controlled to vary the transmission ratio between the input pulley 30 and the output pulley 32.

The controller 68 may also control the motor/generator 54 to function as a motor in a propulsion mode to provide torque for propelling the vehicle 10 when a torque demand is received by the controller during a coasting mode, which may be referred to as a sailing mode. In the coasting mode, the engine 14 is off (i.e., fuel is not provided to the engine 14) and the engine clutch 70 is in the disengaged state. If the controller 68 receives a demand for torque while in the coasting mode, such as by a relatively light depression of the accelerator pedal, the requested torque may be at a level that can be met by the motor/generator 54 alone, and the motor/generator 54 is controlled to function as a motor in propelling the drive axle 48 through the final drive 36. In this mode, the first torque-transmitting device 76 is in the engaged state, and the engine clutch 70 and the second torque-transmitting device 80 are in disengaged states.

The powertrain 12 also enables the motor/generator 54 to be relatively small as sufficient torque multiplication is provided in the engine starting mode and in the propulsion modes. In one embodiment, the motor/generator 54 may have a rated power not less than 4 kilowatts and not greater than 12 kilowatts, may provide 20 to 60 Newton-meters of torque, and may have a nominal voltage not less than 12 volts and not greater than 48 volts. For example, the pinion gear 92, the sliding idler gear 82, and the ring gear 90 establish a torque multiplying gear train through which torque is transferred from the motor/generator 54 to the engine crankshaft 16 when the second torque-transmitting device 80 is engaged. The gear train 92, 82, 90 reduces speed and multiplies torque from the rotor 58 to the crankshaft 16 at a torque multiplication ratio greater than one because the diameter and tooth count of the ring gear 90 is greater than and preferably three or more times that of the diameter and tooth count of the pinion gear 92.

Similarly, the final drive 36 is a two stage final drive that establishes a second torque-multiplication ratio greater than one from the motor/generator 54 to the drive axle 48 when the first torque-transmitting device 76 is engaged and the motor/generator 54 is controlled as a motor to provide torque at the drive axle 48, whether propulsion is by the motor/generator 54 alone or by both the engine 14 and motor/generator 54 in a torque assist mode. The final drive 36 is a gear train with a first stage of torque multiplication from first gear 38 to second gear 40, and a second stage of torque multiplication from the third gear 42 to the fourth gear 44. The second gear 40 has a greater diameter and tooth count than the first gear 38, and the fourth gear 44 has a greater diameter and gear count than the third gear 42. Accordingly, the second torque multiplication ratio is greater than one and is preferably many times greater than one, such as a 6:1 ratio.

The first torque multiplication ratio from the motor/generator 54 to the crankshaft 16 is different than the second torque-multiplication ratio from the motor/generator 54 to the drive axle 48. This allows the motor/generator 54 to run at a speed at which it is efficient, such as a speed that minimizes switching losses, while providing a desired rotational speed of the crankshaft 16 during the engine starting mode, and to run at a range of speeds of the transmission output member 28 while providing sufficient torque for propulsion.

Because the powertrain 12 is operable in the regenerative braking mode regardless of the operating state of the engine 14, regeneration opportunities are sufficient to enable the use of one or more electrically driven vehicle accessories (A) 94. For example, the vehicle accessories 94 may include an air conditioning system, one or more engine or transmission coolant pumps, or other accessories. Powering these accessories with recaptured braking energy converted to electrical power and stored in the energy storage device (B) 64 rather than having engine-driven accessories may improve fuel economy by reducing engine loads.

FIG. 2 shows an embodiment of a second vehicle 110 having a second powertrain 112 within the scope of the present teachings. Many of the components of the vehicle 110 and the powertrain 112 are identical to and function as described with respect to vehicle 10 and powertrain 12 in FIG. 1 and are therefore referenced with identical reference numbers. The powertrain 112 includes a dual clutch transmission 118 operatively connectable to the engine 14 to provide tractive torque to the first and second vehicle wheels 20A, 20B. The transmission 118 has a housing 124, a first transmission input member 126A, a second transmission input member 126B, and a transmission output member 128 at least partially housed within the housing 124. More specifically, the transmission 118 has a first transmission input member 126A, also referred to herein as a first input shaft 126A, and a second transmission input member 126B, also referred to herein as a second input shaft 126B. The second input shaft 126B is concentric with the first input shaft 126A. The second input shaft 126B is a sleeve shaft that concentrically surrounds the first input shaft 126A.

The powertrain 112 has an engine clutch 170 that has a first engaged state that operatively connects the engine crankshaft 16 for common rotation with the first input shaft 126A, a second engaged state that operatively connects the crankshaft 16 for common rotation with the second input shaft 126B, and a disengaged state that operatively disconnects the crankshaft 16 from both of the input shafts 126A, 126B. More specifically, the engine clutch 170 has a clutch housing 171 that extends from and rotates commonly with (i.e., at the same speed as) the crankshaft 16. In the first engaged state, a first actuator (not shown) such as an electrically or hydraulically actuated apply plate engages the clutch housing 171 for rotation with the first input shaft 126A and not with the second input shaft 126B. In a second engaged state, a second actuator (not shown) such as an electrically or hydraulically actuated apply plate engages the clutch housing 171 for rotation with the second input shaft 126B and not with the first input shaft 126A.

The transmission 118 has a transmission output member that is an output shaft 128 parallel with the first and second input shafts 126A, 126B. A plurality of different gear ratios can be established between the first input shaft 126A and the output shaft 128, and between the second input shaft 126B and the output shaft 128 through different intermeshing gear pairs each including an input gear mounted for rotation either on the first input shaft 126A or on the second input shaft 126B, and an output gear mounted for rotation on the output shaft 128. Selectors 137 are actuated by a second electronic controller (C2) 168B to engage the proper input gear for common rotation with the input shaft 126A or 126B to establish the proper gear ratio, as is understood by those skilled in the art. Input gear 131A is mounted for rotation on the second input shaft 126B and meshes with output gear 135A mounted for rotation on output shaft 128 to establish a first gear ratio when a selector 137 engages the input gear 131A with the second input shaft 126B to rotate in unison. Input gear 131B is mounted for rotation on the first input shaft 126A and meshes with output gear 135B mounted for rotation on output shaft 128 to establish a second gear ratio when a selector 137 engages the input gear 131B with the first input shaft 126A to rotate in unison. Input gear 131C is mounted for rotation on the second input shaft 126B and meshes with output gear 135C mounted for rotation on output shaft 128 to establish a third gear ratio when a selector 137 engages the input gear 131C with the second input shaft 126B to rotate in unison. Input gear 131D is mounted for rotation on the first input shaft 126A and meshes with output gear 135D mounted for rotation on output shaft 128 to establish a fourth gear ratio when a selector 137 engages the input gear 131D with the first input shaft 126A to rotate in unison. Input gear 131E is mounted for rotation on the second input shaft 126B and meshes with output gear 135E mounted for rotation on output shaft 128 to establish a fifth gear ratio when a selector 137 engages the input gear 131E with the second input shaft 126B to rotate in unison. The numerical ratio of torque of the output shaft 128 to the input shaft 126A or 126B decreases from the first gear ratio to the fifth gear ratio. A final drive 136 includes an intermeshing torque multiplication gear pair that includes output gear 135E meshing with and driving ring gear 139 mounted to rotate with a housing of differential 46. The final drive 136 transfers torque from the output shaft 128 to the drive axle 48.

The transmission 118 includes a first torque-transmitting device 176 having a selectively engaged state in which the first torque-transmitting device 176 transmits torque between the motor/generator 54 and the transmission output shaft 128 independent of the state of the engine 14, the crankshaft 16, and the engine clutch 170.

A second torque-transmitting device 180 is a sliding pinion gear 182 mounted to rotate with the motor shaft 78, such as by splines, but that slides on the motor shaft 78 when actuated by an actuator 187 such as a solenoid to move in the direction of arrow 186 from a disengaged position shown to an engaged position shown in phantom. In the disengaged position, the second torque-transmitting device 180 is in a disengaged state. In the engaged position, the sliding pinion gear 182 meshes with a ring gear 190 that is mounted on the clutch housing 171 to rotate commonly with the second input shaft 126B, establishing an engaged state. In the engaged state, torque is transferred from the motor/generator 54 to the crankshaft 16 at a torque multiplication ratio determined by the tooth counts of the pinion gear 182 and the ring gear 190.

In the embodiment shown, two electronic controllers (C1) 168A and (C2) 168B are used to control the powertrain 12 in addition to the controller in the MPIM 66. A first electronic controller (C1) 168A is operatively connected to the first torque-transmitting device 176, the second torque-transmitting device 180, the MPIM 66, and the mechanical braking systems 52A, 52B (connection not shown for purposes of clarity in the drawings). A second electronic controller (C2) 168B is operatively connected to the engine clutch 170 and to the selectors 137. The controllers (C1) 168A, and (C2) 168B receive operating input signals indicative of vehicle operating conditions from these and various other components, as discussed herein.

The controllers (C1) 168A, (C2) 168B control the powertrain 112 to establish a regenerative braking mode, an engine starting mode that may be an auto-start, a propulsion mode that provides torque to the drive axle 48, either from the motor/generator 54 alone, or from both the motor/generator 54 and the engine 14 in a torque assist mode. The operating modes are established in the same manner as described with respect to powertrain 12 of FIG. 1, with the engine clutch 170 controlled in the same manner as engine clutch 70, the first torque-transmitting device 176 controlled in the same manner as first torque-transmitting device 176, and the second torque-transmitting device 180 controlled in the same manner as second torque-transmitting device 80, to respective engaged or disengaged states to establish the respective modes dependent on vehicle operating conditions. Specifically, the second torque-transmitting device 180 is in the engaged state and the first torque-transmitting device 176 and the engine clutch 170 are in disengaged states with the motor/generator 54 controlled to function as a motor in the engine starting mode. The first torque-transmitting device 176 is in the engaged state and the second torque-transmitting device 180 and the engine clutch 170 are in disengaged states with the motor/generator 54 controlled to function as a generator in a regenerative braking mode. The first torque-transmitting device 176 is in the engaged state and the second torque-transmitting device 180 is in the disengaged state with the motor/generator 54 controlled to function as a motor in a propulsion mode, either with the engine clutch 170 disengaged, or with the engine clutch 170 engaged in a torque assist mode. Optionally, the second electronic controller C2) 168B can control the engine clutch 170 to slip to synchronize the speed of the engine crankshaft 16 with the speed of the transmission input shafts 126A or 126B following starting of the engine 14 with the motor/generator 54. Additionally, as with powertrain 12, the stored algorithm executed by the processors of the controllers 168A, 168B may include a brake blending module in which braking energy provided by the mechanical braking systems 52A, 52B is combined with braking energy provided by regenerative braking to meet a predetermined braking torque demand received as a vehicle operating condition input to the controllers 168A, 168B, such as from depression of a brake pedal, and/or a vehicle deceleration signal.

Like powertrain 12, the regenerative braking mode can be established in powertrain 112 independent of the state of the engine 14. The regenerative braking mode may be dependent upon additional vehicle operating conditions, such as state-of-charge of the energy storage device (B) 64. Because the powertrain 112 is operable in the regenerative braking mode regardless of the operating state of the engine 14, regeneration opportunities are sufficient to enable the use of one or more electrically driven vehicle accessories (A) 94. Additionally, the motor/generator 54 is the only electric motor/generator used in the powertrain to establish operating modes, to provide torque to the drive axle 48, and to capture regenerative braking energy.

FIG. 3 shows an embodiment of a third vehicle 210 having a third powertrain 212 within the scope of the present teachings. Many of the components of the vehicle 210 and the powertrain 212 are identical to and function as described with respect to vehicle 10 and powertrain 12 in FIG. 1 and are therefore referenced with identical reference numbers. The powertrain 212 includes a multi-speed transmission 218 operatively connectable to the engine (E) 14 to provide tractive torque to the first and second vehicle wheels 20A, 20B. The transmission 218 is arranged in a longitudinal, rear wheel-drive arrangement as the transmission 218 has a transmission input member 226 and a transmission output member 228 coaxial with one another. The transmission 218 has a transmission housing 224 that houses multiple selectively engageable torque-transmitting devices and intermeshing gears, such as planetary gear sets, controllable to establish multiple different gear ratios between the transmission input member 226 and the transmission output member 228 as is understood by those skilled in the art.

The powertrain 212 has an engine clutch 270 that has a first engaged state that operatively connects the engine crankshaft 216 for common rotation with the transmission input member 226, and a disengaged state that operatively disconnects the crankshaft 216 from the input member 226. More specifically, the engine clutch 270 has an actuator (not shown) such as an electrically or hydraulically actuated apply plate that is activated by a control signal from the controller (C) 68 to engage sets of clutch plates to establish the engaged state, as is understood by those skilled in the art.

A final drive 236 includes a pinion bevel gear 235 rotating with the output member 228, and meshing with a ring bevel gear 239 mounted to rotate with housing of a differential 46 to transfer torque from the transmission output member 228 to the drive axle 248, which includes half shaft 248A and 248B. The drive axle 248 is a rear drive axle. The tooth counts of the bevel gears 235, 239 may be configured with a torque multiplication ratio to increase torque from the transmission output member 228 to the drive axle 248.

The powertrain 212 includes a motor/generator 54A that is alike in all aspects to motor/generator 54 described with respect to FIG. 1, except motor/generator 54A is configured as dual shaft motor/generator having a first motor shaft 78A extending in a first direction from the rotor 58, and a second motor shaft 78B extending in an opposite second direction from the rotor 58. As is evident in FIG. 3, the first direction is toward the axle 248 and the second direction is toward the engine 14. The motor shafts 78A, 78B are parallel or substantially parallel with the crankshaft 216, the transmission input member 226, and the transmission output member 228.

A drive train includes a first gear 238 mounted on the transmission output member 228 and a second gear 237 meshing with the first gear 238. The second gear 237 is supported on bearings by a stationary member such as a frame (not shown). A first torque-transmitting device 276 includes an apply member 277 movable by an electrically activated actuator 279, such as a solenoid, in response to a control signal from the controller 68 to engage with a face of the second gear 237 so that the first motor shaft 78A and the second gear 237 rotate in unison and torque is transmitted between the motor/generator 54A and the transmission output member 228. Torque transfer through the engaged first torque-transmitting device 276 is independent of the state of the engine 14, the crankshaft 216, and the engine clutch 270. Alternately, instead of positioning the first torque-transmitting device 276 to operate between the motor shaft 78A and the second gear 237, the first torque-transmitting device 276 could be positioned to operate between the first gear 238 and the transmission output member 228.

Alternatively, instead of intermeshing gears 237, 238, a chain and sprocket drivetrain could be used to transfer torque from the first motor shaft 78A to the transmission output member 228. Specifically, a first sprocket could be mounted to rotate with the transmission output member 228, and could be connected by a chain to a second sprocket. The second sprocket would be driven by the first motor shaft 78A when engaged with the first motor shaft 78A by the first torque-transmitting device 276. Because the sprockets would rotate in the same direction, in that case the first and second motor shafts 78A, 78B would rotate in the same direction as the transmission output member 228. An idler gear would therefore be necessary between the pinion gear 282 and the ring gear 290 to maintain the same direction of rotation for the motor/generator 54A for each of the modes of operation (except for reverse).

The powertrain 212 includes a second torque-transmitting device 280 that is a sliding pinion gear 282 mounted coaxially to rotate with the second motor shaft 78B, such as by splines, but that slides on the second motor shaft 78B when actuated by an actuator 287 such as a solenoid to move from a disengaged position shown to an engaged position shown in phantom. In the disengaged position, the second torque-transmitting device 280 is in a disengaged state. In the engaged position, the sliding pinion gear 282 meshes with a ring gear 290 that is mounted to rotate commonly with the crankshaft 216. In the engaged state, torque is transferred from the motor/generator 54A to the crankshaft 216 at a torque multiplication ratio determined by the tooth counts of the pinion gear 282 and the ring gear 290.

In the embodiment shown, the electronic controller 68 is used to control the powertrain 212 in addition to the controller in the MPIM (M) 66. The electronic controller (C) 68 is operatively connected to the first torque-transmitting device 276, the second torque-transmitting device 280, the engine clutch 270, the MPIM 66, and the mechanical braking systems 52A, 52B. The connections of the controller (C) 68 to the engine clutch 270 and to the mechanical braking systems 52A, 52B are not shown for purposes of clarity in the drawings. The controller (C) 68 receives operating input signals indicative of vehicle operating conditions from these and various other components, as discussed herein.

The controller (C) 68 control the powertrain 212 to establish a regenerative braking mode, an engine starting mode that may be an auto-start, a propulsion mode that provides torque to the drive axle 248, either from the motor/generator 54A alone, or from both the motor/generator 54A and the engine 14 in a torque assist mode. The operating modes are established in the same manner as described with respect to powertrain 12 of FIG. 1, with the engine clutch 270 controlled in the same manner as engine clutch 70, the first torque-transmitting device 276 controlled in the same manner as first torque-transmitting device 76, and the second torque-transmitting device 280 controlled in the same manner as second torque-transmitting device 80, to respective engaged or disengaged states to establish the respective modes dependent on vehicle operating conditions. Specifically, the second torque-transmitting device 280 is in the engaged state and the first torque-transmitting device 276 and the engine clutch 270 are in disengaged states with the motor/generator 54A controlled to function as a motor in the engine starting mode. The first torque-transmitting device 276 is in the engaged state and the second torque-transmitting device 280 and the engine clutch 270 are in disengaged states with the motor/generator 54A controlled to function as a generator in a regenerative braking mode. The first torque-transmitting device 276 is in the engaged state and the second torque-transmitting device 280 is in the disengaged state with the motor/generator 54A controlled to function as a motor in a propulsion mode, either with the engine clutch 270 disengaged, or with the engine clutch 270 engaged in a torque assist mode. Optionally, the electronic controller 68 can control the engine clutch 270 to slip to synchronize the speed of the engine crankshaft 216 with the speed of the transmission input member 226 following starting of the engine 14 with the motor/generator 54A. Additionally, as with powertrain 12 of FIG. 1, the stored algorithm executed by the processor of the controller (C) 68 may include a brake blending module in which braking energy provided by the mechanical braking systems 52A, 52B is combined with braking energy provided by regenerative braking to meet a predetermined braking torque demand received as a vehicle operating condition input to the controller (C) 68, such as from depression of a brake pedal, and/or a vehicle deceleration signal.

Like powertrain 12, the regenerative braking mode can be established in powertrain 212 independent of the state of the engine 14. The regenerative braking mode may be dependent upon additional vehicle operating conditions, such as state-of-charge of the energy storage device (B) 64. Because the powertrain 212 is operable in the regenerative braking mode regardless of the operating state of the engine 14, regeneration opportunities are sufficient to enable the use of one or more electrically driven vehicle accessories (A) 94. Additionally, the motor/generator 54A is the only electric motor/generator used in the powertrain to establish operating modes, to provide torque to the drive axle 248, and to capture regenerative braking energy.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A powertrain comprising:
   an engine having a rotatable crankshaft;
   a transmission having a transmission input member and a transmission output member; wherein the transmission is a continuously variable transmission; wherein the transmission output member is an output pulley shaft;
   a final drive operatively connected to the transmission output member and including a drive axle;
   a motor/generator; wherein the motor/generator has a motor shaft;
   an engine clutch having an engaged state that operatively connects the engine crankshaft with the transmission input member, and having a disengaged state that operatively disconnects the engine crankshaft from the transmission input member;
   a first torque-transmitting device having a selectively engaged state in which the first torque-transmitting device transmits torque between the motor/generator and the transmission output member independent of the engine, the crankshaft, and the engine clutch;
   a second torque-transmitting device having a selectively engaged state in which the second torque-transmitting device transmits torque between the motor/generator and the crankshaft independent of the first torque-transmitting device and the engine clutch;
   a ring gear mounted on the crankshaft;
   a pinion gear mounted on the motor shaft;
   wherein the second torque-transmitting device is a sliding idler gear that meshes with both the ring gear and the pinion gear when moved from a disengaged position to an engaged position to establish the engaged state to thereby transmit torque from the motor/generator to the crankshaft;
   at least one electronic controller operatively connected to the motor/generator, the engine clutch, and the first and second torque-transmitting devices to control the motor/generator to function as a motor or as a generator, and to control the states of the engine clutch, and the first and second torque-transmitting devices;
   wherein the powertrain establishes a regenerative braking mode when the first torque-transmitting device is engaged, the second torque-transmitting device is disengaged, and the motor/generator functions as a generator to capture regenerative braking energy; and
   wherein the powertrain establishes an engine starting mode when the second torque-transmitting device is engaged, the first torque-transmitting device is disengaged, and the motor/generator is controlled to function as a motor to start the engine.

2. The powertrain of claim 1, wherein said at least one electronic controller controls the engine clutch to establish the disengaged state during the regenerative braking mode and during the engine starting mode.

3. The powertrain of claim 1, wherein said at least one electronic controller controls the engine clutch to be in the engaged state, the first torque-transmitting device to be in the engaged state, the second torque-transmitting device to be in the disengaged state, and the motor/generator to function as a motor to assist the engine in propelling the driveshaft.

4. The powertrain of claim 1, wherein said at least one electronic controller controls the engine clutch to be in the disengaged state, the first torque-transmitting device to be in the engaged state, the second torque-transmitting device to be in the disengaged state, and the motor/generator to function as a motor to propel the driveshaft.

5. The powertrain of claim 1, wherein the electronic controller controls the engine clutch to slip the engine clutch to synchronize speed of the engine crankshaft with the transmission input member following starting of the engine with the motor/generator.

6. The powertrain of claim 1, further comprising:
   a gear train from the motor/generator to the engine crankshaft having a first torque-multiplication ratio greater than one established when the second torque-transmitting device is engaged;
   wherein the final drive establishes a second torque-multiplication ratio greater than one from the motor/generator to the drive axle when the first torque-transmitting device is engaged; and
   wherein the first torque-multiplication ratio is different than the second torque-multiplication ratio.

7. The powertrain of claim 1 in combination with at least one electrical vehicle accessory operatively connected to the motor/generator and powered by the captured regenerative braking energy.

8. The powertrain of claim 1, wherein the motor/generator is the only motor/generator operable to provide torque to the drive axle and to capture regenerative braking energy.

9. The powertrain of claim 8, wherein the motor/generator has a rated power not less than 4 kilowatts and not greater than 12 kilowatts, provides 20 to 60 Newton-meters of torque, and has a nominal voltage not less than 12 volts and not greater than 48 volts.

10. The powertrain of claim 1, wherein the transmission has a transmission housing; and
    wherein the first torque transmitting device is within the transmission housing.

11. A vehicle comprising:
    a powertrain that includes:
      an engine having a rotatable crankshaft;
      a transmission having an input member and an output member;
      a final drive operatively connected to the transmission output member and including a drive axle;
      a motor/generator;
      only three selectively engageable torque-transmitting devices including:
        an engine clutch having an engaged state that operatively connects the engine crankshaft with the transmission input member, and having a disengaged state that operatively disconnects the engine crankshaft from the transmission input member;
        a first torque-transmitting device having a selectively engaged state in which the first torque-transmitting device transmits torque between the motor/generator and the transmission output member independent of the engine, the crankshaft, and the engine clutch;
        a second torque-transmitting device having a selectively engaged state in which the second torque-transmitting device transmits torque between the motor/generator and the crankshaft independent of the first torque-transmitting device and the engine clutch;
    first and second wheels rotatably driven by the drive axle;
    a first mechanical braking system mounted at the first wheel and operable to slow the first wheel;
    a second mechanical braking system mounted at the second wheel and operable to slow the second wheel;

at least one electronic controller operatively connected to the first and second braking systems, the motor/generator, the engine clutch, and the first and second torque-transmitting devices to control the motor/generator to function as a motor or as a generator, and to control the states of the engine clutch, and the first and second torque-transmitting devices;

wherein the powertrain establishes a regenerative braking mode when only the first torque-transmitting device is engaged, the second torque-transmitting device is disengaged, and the motor/generator functions as a generator to capture regenerative braking energy; and wherein the controller is operable to coordinate braking energy provided by the mechanical braking systems with regenerative braking energy captured by the motor/generator to meet a braking energy demand.

12. The vehicle of claim 11, wherein the regenerative braking mode occurs both when the engine is off and when the engine is on.

13. A vehicle comprising:
a powertrain including:
an engine having a rotatable crankshaft;
a transmission having an input member and an output member;
a final drive operatively connected to the transmission output member and including a drive axle;
a motor/generator;
only three selectively-engageable torque-transmitting devices including:
an engine clutch having an engaged state that operatively connects the engine crankshaft with the transmission input member, and having a disengaged state that operatively disconnects the engine crankshaft from the transmission input member;
a first torque-transmitting device having a selectively engaged state in which the first torque-transmitting device transmits torque between the motor/generator and the transmission output member independent of the engine, the crankshaft, and the engine clutch;
a second torque-transmitting device having a selectively engaged state in which the second torque-transmitting device transmits torque between the motor/generator and the crankshaft independent of the first torque-transmitting device and the engine clutch;
first and second wheels rotatably driven by the drive axle;

a first mechanical braking system mounted at the first wheel and operable to slow the first wheel;
a second mechanical braking system mounted at the second wheel and operable to slow the second wheel;
at least one electronic controller operatively connected to the first and second braking systems, the motor/generator, the engine clutch, and the first and second torque-transmitting devices to control the motor/generator to function as a motor or as a generator, and to control the states of the engine clutch, and the first and second torque-transmitting devices;

wherein the powertrain establishes a regenerative braking mode when the first torque-transmitting device is engaged, the second torque-transmitting device is disengaged, and the motor/generator functions as a generator to capture regenerative braking energy;

wherein the controller is operable to coordinate braking energy provided by the mechanical braking systems with regenerative braking energy captured by the motor/generator to meet a braking energy demand; and wherein the powertrain establishes an auto-start mode when the second torque-transmitting device is engaged, the first torque-transmitting device is disengaged, and the motor/generator is controlled to function as a motor to start the engine.

14. The vehicle of claim 13, wherein said at least one electronic controller controls the engine clutch to establish the disengaged state during the regenerative braking mode and during the auto-start mode.

15. The vehicle of claim 11, wherein said at least one electronic controller controls the engine clutch to be in the engaged state, the first torque-transmitting device to be in the engaged state, the second torque-transmitting device to be in the disengaged state, and the motor/generator to function as a motor to assist the engine in propelling the driveshaft; and wherein said at least one electronic controller controls the engine clutch to be in the disengaged state, the first torque-transmitting device to be in the engaged state, the second torque-transmitting device to be in the disengaged state, and the motor/generator to function as a motor to propel the driveshaft.

16. The vehicle of claim 11, further comprising:
at least one electrical vehicle accessory operatively connected to the motor/generator and powered by the captured regenerative braking energy.

* * * * *